United States Patent [19]

Martich

[11] Patent Number: 5,325,023

[45] Date of Patent: Jun. 28, 1994

[54] OUTDOOR LIGHTING CONTROL APPARATUS

[75] Inventor: Mark E. Martich, Hanover, Mass.

[73] Assignee: Pacific Scientific Company, Weymouth, Mass.

[21] Appl. No.: 75,993

[22] Filed: Jun. 11, 1993

Related U.S. Application Data

[63] Continuation-in-part of Ser. No. 25,963, Mar. 3, 1993, abandoned.

[51] Int. Cl.$^5$ .............................................. H05B 37/02
[52] U.S. Cl. ...................................... 315/159; 250/205
[58] Field of Search ...................... 315/159, 158, 156; 250/205

[56] References Cited

U.S. PATENT DOCUMENTS

| | | | |
|---|---|---|---|
| 4,507,767 | 3/1985 | Takasugi | 250/205 |
| 4,645,980 | 2/1987 | Yang | 315/129 |
| 4,727,290 | 2/1988 | Smith et al. | 250/205 |
| 4,810,936 | 3/1989 | Nuckolls et al. | 315/129 |
| 4,857,825 | 8/1989 | Anderson | 250/205 |
| 4,886,961 | 12/1989 | Kimura et al. | 250/205 |
| 4,908,552 | 3/1990 | Kumakura | 315/129 |
| 5,105,124 | 4/1992 | Futsuhara et al. | 315/129 |
| 5,239,234 | 8/1993 | Pischke et al. | 315/129 |

Primary Examiner—John T. Kwon
Attorney, Agent, or Firm—Lahive & Cockfield

[57] ABSTRACT

An outdoor lighting control circuit for operation with a variable input voltage and with an electrical lamp, the circuit including a first resistive impedance element for protecting the circuit from excessive current, and a photosensitive element for presenting a first impedance when actuated by light and a different second impedance in the absence of light. The photosensitive element is electrically in series with the first resistive impedance element, to form a first series combination. An electrical relay in the circuit has contacts for selectively connecting the load to the input voltage and has a relay coil. A second resistive impedance element of the circuit controls the current in the relay coil. The second resistive impedance element is electrically in parallel with the relay coil, to form a first parallel combination. The first parallel combination is electrically in series with the first series combination, all elements being between the input terminals that receive the operating voltage.

8 Claims, 1 Drawing Sheet

OUTDOOR LIGHTING CONTROL APPARATUS

REFERENCE TO RELATED APPLICATIONS

This application is a continuation-in-part of the commonly-assigned and copending application Ser. No. 025,963 filed Mar. 3, 1993 for "Outdoor Lighting Control Apparatus" now abandoned.

BACKGROUND

This invention relates to automatic electric controls for outdoor lighting. In particular, it provides an outdoor lighting control circuit having improvements regarding input operating voltage and electrical power consumption.

Outdoor lighting control circuits have widespread uses to control lamps for illuminating streets, parks, parking lots, and the like. The control circuits typically turn the lamps on at dusk and off at sunrise. It is desired, for reasons of public safety and for economy, that outdoor lighting controls operate reliably for extended periods of time, measured in years.

Another objective is that a single manufactured outdoor lighting control device can provide such long-term reliable operation with a relatively wide range of input operating voltages. The achievement of this variable input operating voltage performance enables the same control device to be used in different locations that have different operating or supply voltages.

Typically, outdoor lighting control circuits include a photosensitive element that responds to the presence or absence of ambient light. The photosensitive element is connected to a relay having contacts that selectively apply operating current to a lamp. The device is to provide sufficient current in the relay coil for reliable operation when receiving an operating voltage at the low end of the specified operating voltage range. It also is to limit the relay current to prevent relay burnout or other destructive operation when operating with a voltage at the upper end of the specified operating range. Further, the device is to provide multi-year reliable operation with an input voltage anywhere in the operating range. One prior outdoor lighting control circuit of this type for operation with a range of input voltages is marked under the designation 6690 "Dual Volt" lighting control by Fisher Pierce of Weymouth, Mass., U.S.A.

Prior circuits for this control of lamps and similar electrical loads in response to ambient lighting conditions have proven less than optimal, and an object of this invention is to provide an electrical control circuit responsive to ambient light that operates with relatively high reliability over a relatively broad range of input operating voltages.

Another object of the invention is to provide a control circuit in the above character that dissipates relatively little electrical power, with a selected range of input operating voltages.

A further object of the invention is to provide a control circuit that automatically turns an outdoor lamp device on and off, at dusk and dawn respectively, at appropriate levels of ambient light and under a relatively wide range of operating voltages.

Still another object of the invention is to provide a control circuit in the above character that is relatively low in manufacturing costs.

Other objects of the invention will in part be obvious and will in part appear hereinafter.

SUMMARY OF THE INVENTION

The invention attains the foregoing and other objects with an outdoor lighting control circuit for operation with a variable input voltage and with an electrical lamp or other resistive load, and that includes a first resistive impedance element for protecting the circuit from excessive current, and a photosensitive element for presenting a first impedance when actuated by light and a different second impedance in the absence of light. The photosensitive element is electrically in series with the first resistive impedance element, to form a first series combination. An electrical relay in the circuit has contacts for selectively connecting the load to the input voltage and has a relay coil. A second resistive impedance element is electrically in parallel with the relay coil, to form a first parallel combination. The first parallel combination is electrically in series with the first series combination, between the input terminals that receive the operating voltage.

The second resistive impedance element, which offers varying resistance depending on applied voltage, operates in conjunction with the first resistive impedance element, which can be a fixed resistor, to control the current in the relay coil. The second resistive impedance element preferably includes a varistor.

In a preferred embodiment, the photosensitive element has a relatively high electrical impedance during nighttime operation which minimizes the current in the first and second impedance elements. This is desirable to minimize power consumption, and thereby to increase the electrical efficiency and reliability of the control circuit.

The first impedance element is selected primarily to enhance daylight operation, when the photosensitive element has a relatively low electrical impedance. The resistive impedance of this element is selected so that the current in the relay coil is sufficient to actuate the relay at low-range input voltages while not burning out the relay at high-range input voltages. The electrical consumption of the device is greater during daytime, i.e., ambient-only conditions, than during darkness when the luminaire lamp is turned on. This is desirable for prolonged operation, especially with a variable input voltage.

In another preferred embodiment, the second resistive impedance element includes a series combination of a varistor and a resistor. The parameter values of the resistor and of the first impedance element can, in this embodiment, be advantageously selected to enhance operation of the device, including calibration.

BRIEF DESCRIPTION OF DRAWINGS

The foregoing and other objects of the invention can be more fully understood from the following description and the accompanying drawings, in which.

DESCRIPTION OF ILLUSTRATED EMBODIMENT

Figure 1:
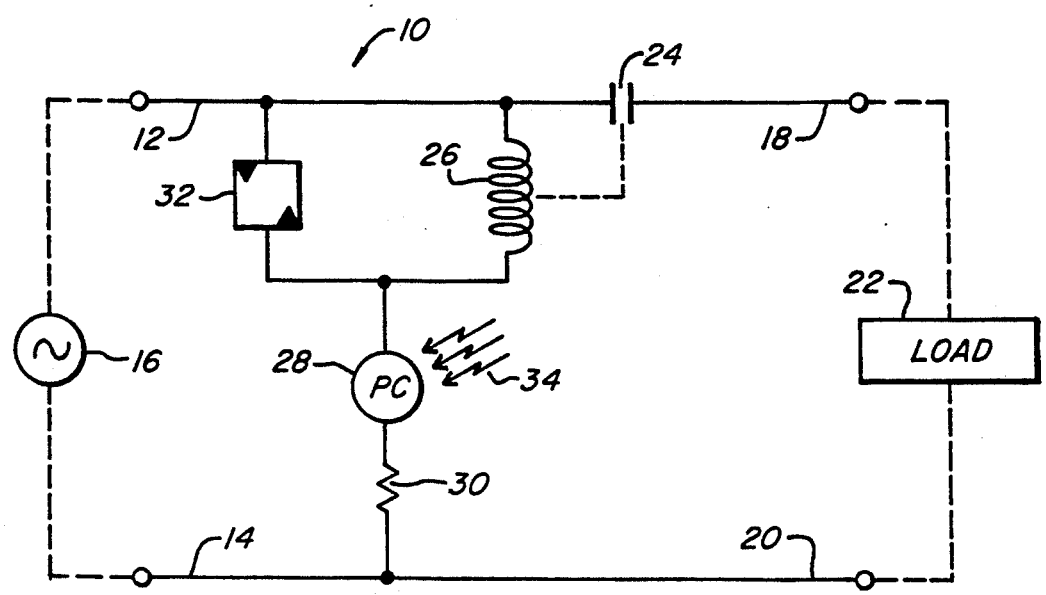
FIG. 1 is a schematic circuit representation of an outdoor lighting control device according to a preferred embodiment of the invention.

An outdoor lighting control circuit 10 according to the invention has, as depicted in FIG. 1, a pair of input terminals 12,14 for receiving a variable input operating voltage as from a source 16, and has a pair of output terminals 18,20 for connection to an electrical lighting load 22.

A set of normally closed contacts 24, of a relay having a coil 26, is in series between one output terminal 18 and one input terminal 12. The relay coil 26 is electrically in series with a photosensitive element 28 and a first fixed resistive impedance element 30 between the input terminals 12 and 14. A second varying resistive impedance element 32 is connected electrically in parallel with the relay coil 26.

During daylight operation of the control circuit 10, ambient light, indicated with arrows 34 incident on the photosensitive element 28, causes the photosensitive element to have a relatively low electrical impedance. That low impedance of the photosensitive element, which is in series with the relay coil 26 and with the first resistive element 30, permits sufficient current to actuate the relay and open the normally-closed relay contact 24. The contact 24 thus disconnects the load 22 from the supply voltage at the input terminals 12, 14. The second resistive impedance element in parallel with the relay coil 26 controls the current in the relay coil from an excessive level and thus limits the current in the relay coil 26.

During nighttime or other condition of low ambient light incident on the photosensitive element 28, it has a relatively high impedance. Hence, there is relatively little or nominal current in the photosensitive element and correspondingly little or nominal current in the relay coil 26 and in the first resistive impedance element 30. The low current level is insufficient to hold the relay in an actuated condition, e.g., open the contacts. The contacts resume the normally closed position and apply current to the lamp load 22.

Accordingly under the latter condition, the control circuit 10 draws little or nominal current. There accordingly is little electrical power dissipation in any component of the circuit, so that it operates with relatively high electrical efficiency.

The shunt-connected second resistive impedance element 32 limits the current in the relay coil 26 under the former condition of low impedance in the photosensitive element. This protects the relay coil from burnout by excessive current that might otherwise occur when the input operating voltage at the terminals 12 and 14 is at a high level.

In a preferred embodiment, the second resistive element 32 is a voltage-dependent nonlinear resistor, or varistor, to enhance the protective operation over a wide range of input voltages. The other resistive element 30, however, is a fixed resistor. The value of resistor 30 is selected to obtain the desired current level in the relay coil 26 when the photosensitive element 28 is electrically conductive, under the minimal selected input voltage, and to limit the current in the relay/varistor combination to below damage level, under the maximum selected input voltage. In a preferred embodiment, the first resistive element 30 is a 12 kΩ resistor having a 4 watt rating.

By way of further illustration and without limitation, the preferred lighting control device of FIG. 1 having the control circuit 10 operates with an input voltage between 100 and 300 volts ac, and preferably between 120 and 277 volts. The second resistive element is a type silicon carbide varistor, the photosensitive element 28 is a type cadmium sulfide photocell, and the relay coil has a 7800 ohm dc resistance.

Figure 2:
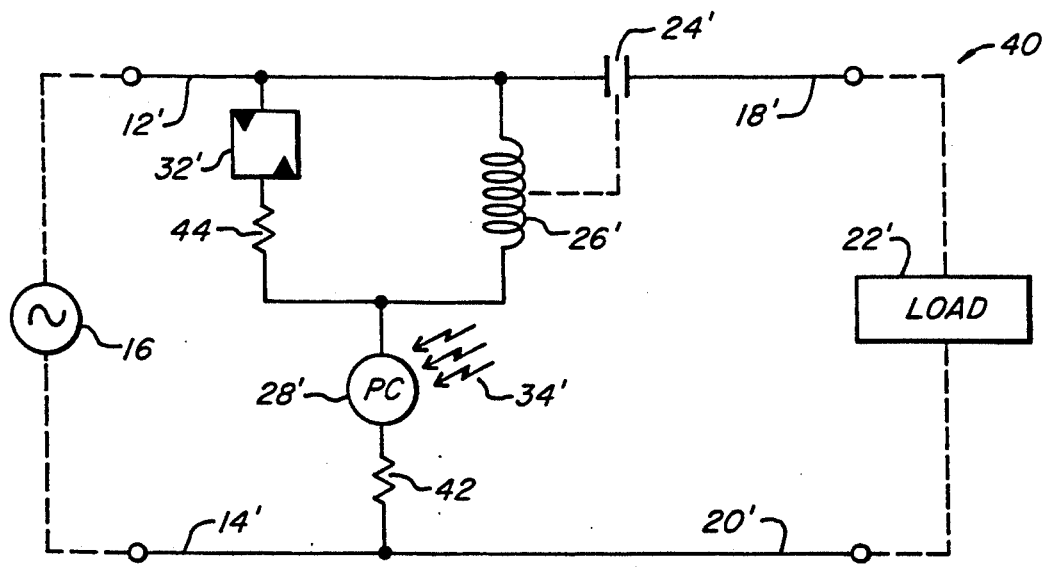
FIG. 2 is a schematic circuit representation of an outdoor lighting control device according to another preferred embodiment of the invention.

FIG. 2 shows another control circuit 40 according to the invention. Circuit 40 is similar to circuit 10 depicted in FIG. 1, and corresponding elements are designated with the same reference numerals plus a prime superscript. For example, the FIG. 2 photocell 28' corresponds to the photocell 28 of FIG. 1.

The control circuit 40 has a pair of input terminals 12',14' for receiving a variable input voltage, and a pair of output terminals 18',20' for connection to an electrical lighting load 22'. The photocell 28' is electrically in series with a first fixed resistive impedance element 42. The relay coil 26' is connected electrically in parallel with the series combination of the varistor 32' and a second fixed resistance impedance 44. The parallel combination of the relay coil 26', varistor 32', and second fixed impedance element 44 is electrically in series with the series combination of the photocell 28' and first resistive impedance 42. The relay which has the relay coil 26' has a set of normally-closed contacts 24' in series between one output terminal 18' and one input terminal 12'.

The first fixed resistive element 42 has an impedance less than the first resistive element 30 of FIG. 1. In one practice of the invention, the combined values of the first fixed resistive element 42 and the second fixed resistive element 44 is closely equal to the resistance value of the resistive element 30.

The control circuit 40 operates in a manner similar to above-described circuit 10. For example, during daylight operation, ambient light, represented by wavy arrows 34 incident on the photosensitive element 28', causes the photosensitive element 28 to have a relatively low electrical impedance. This low impedance permits sufficient current in the series combination of the first resistive element 42, the photocell 28' and the coil 26', to activate the relay so that it opens the normally-closed contacts 24'.

The first fixed resistive element 42 is small enough to permit an actuating level of current in the relay coil 26' without burning-out the coil, yet large enough to attain a sufficient current in the relay coil, with a low input voltage at terminals 12', 14', for the relay to open the contacts 24' under all daylight lighting conditions. The smaller impedance of resistive element 42 permits a higher current in coil 26', than in the FIG. 1 embodiment. The higher relay current provides for easier calibration of the control circuit 40 by reducing the sensitivity of the relay operation to variations in the relay contact gap width, e.g., pole gap. These characteristics improve the performance and prolong the life of the circuit 40.

The second fixed resistive element 44 in series with the varistor 32' limit the current in the varistor. This protects the varistor 32' from burnout by overcurrents that otherwise might occur when the operating voltage at the input terminals 12', 14' is at or near the maximum input voltage range, under a high input voltage condition.

During nighttime operation of the FIG. 2 circuit 40, the photosensitive element has a relatively high impedance. That high impedance restricts the current in the relay coil to a relatively low level, insufficient to activate the relay. Thus, the contacts 24 remain in their normally-closed position, thereby applying current to the lamp load 22. Further, under this nighttime condition, the current in the varistor 32' and in the second resistive element 44 is negligible.

The overall increased current through the relay coil 26' during both daytime and nighttime operation, provides for better operational performance when the control circuit 40 operates at or near the minimum voltage levels applied to input terminals 12, 14. The increased coil current ensures that the control circuit connects the lamp load 22' at dusk and disconnects the load 22' at dawn, at appropriate levels of ambient light and under a relatively wide range of operating voltages.

In one embodiment of the FIG. 2 circuit, the varistor 32' is a silicon carbide varistor, and the relay coil 26 has a 7500 ohm dc resistance. The first fixed resistive element 42 is a fixed resistor having a resistance of 3.9 KΩ with a 2 watt rating. The second fixed resistive element 44 is a fixed resistor having a resistance of 10 KΩ with a 1 watt rating.

It will thus be seen that the objects set forth above, among those made apparent from the preceding description, are efficiently attained. Since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

What is claimed as new and desired to be secured by Letters Patent is:

1. An outdoor lighting control circuit for operation with a variable input voltage ranging between a selected minimum voltage and a selected maximum voltage and with an electrical load, said circuit comprising
   A. first resistive impedance means,
   B. photosensitive means electrically in series with said first resistive impedance means, and having a first electrical impedance in the presence of light and a different second impedance in the absence of light,
   C. an electrical relay having contacts for connection with said electrical load and having a relay coil,
   D. second resistive impedance means electrically in parallel with said electrical relay coil, and
   E. said parallel combination of said second resistive impedance means and said relay coil being electrically in series with said series combination of said photosensitive means and said first resistive impedance means.

2. A circuit according to claim 1 wherein said first resistive impedance means has an impedance value for protecting said electrical relay from overcurrents when said variable input voltage is at said selected maximum voltage.

3. A circuit according to claim 1 wherein said first resistive impedance means comprises a first fixed resistor.

4. A circuit according to claim 1 wherein said second resistive impedance means comprises a series combination of a varistor and a second fixed resistor.

5. A circuit according to claim 4 wherein said second fixed resistor has an impedance value for protecting said varistor from overcurrent.

6. A circuit according to claim 1 wherein said second resistive impedance means comprises a varistor.

7. A circuit according to claim 1 wherein said photosensitive means develops relatively low impedance in response to incident ambient light and develops a relatively high impedance in the absence of incident ambient light.

8. In an outdoor lighting control circuit having input terminals for receiving an input voltage variable within a selected range and having output terminals for connection to an electrical load including a lamp device, said control circuit having a resistor element and a photosensitive element and a relay coil identically in series between said input terminals and having contacts of the relay arranged for connection to the lamp, the improvement comprising
   a nonlinear voltage dependent resistor element, the resistance of which is inversely related to the applied voltage, connected electrically in parallel with said relay coil, so that the parallel combination of the voltage dependent resistor and of said relay coil are in series with said resistor element and said photosensitive element.

* * * * *